US005482627A

United States Patent [19]
Pierson

[11] Patent Number: 5,482,627
[45] Date of Patent: Jan. 9, 1996

[54] SEPARATION METHOD

[75] Inventor: Henri G. W. Pierson, Tenerife, Spain

[73] Assignee: D & C Limited, Monrovia, Liberia

[21] Appl. No.: 113,754

[22] Filed: Aug. 31, 1993

[30] Foreign Application Priority Data

Sep. 9, 1992 [GB] United Kingdom ............... 9219062

[51] Int. Cl.$^6$ .................................................. B01D 37/02
[52] U.S. Cl. ...................... 210/770; 210/772; 210/805
[58] Field of Search .................................. 210/770–772, 210/783, 805

[56] References Cited

U.S. PATENT DOCUMENTS

| | | | |
|---|---|---|---|
| 4,385,903 | 5/1983 | Moriyama et al. | 210/772 |
| 4,559,143 | 12/1985 | Asada et al. | 210/714 |
| 4,710,298 | 12/1987 | Noda et al. | 210/505 |
| 5,011,612 | 4/1991 | Keeney | 210/712 |
| 5,096,597 | 3/1992 | Nichols et al. | 210/728 |
| 5,167,831 | 12/1992 | Dimas | 210/728 |

FOREIGN PATENT DOCUMENTS

| | | |
|---|---|---|
| 1308054 | 2/1973 | United Kingdom . |
| 2066685 | 7/1981 | United Kingdom . |

*Primary Examiner*—Matthew O. Savage
*Attorney, Agent, or Firm*—Dennison, Meserole, Pollack & Scheiner

[57] ABSTRACT

A method of separating solid particles from a mixture of solid and liquid components comprises filtering the mixture to provide a damp filter cake and adding a liquid densification aid to the filter cake to promote densification of the cake. The method is useful for separation of inorganic, generally crystalline, materials from aqueous slurries, for example. Suitable densification aids are flocculating agents such as solutions of alginates and gelatin, and surface active agents. The densification aids promote closer packing of solid particles in the filter cake and assist removal of residual liquid component trapped in interstices between particles.

19 Claims, 1 Drawing Sheet

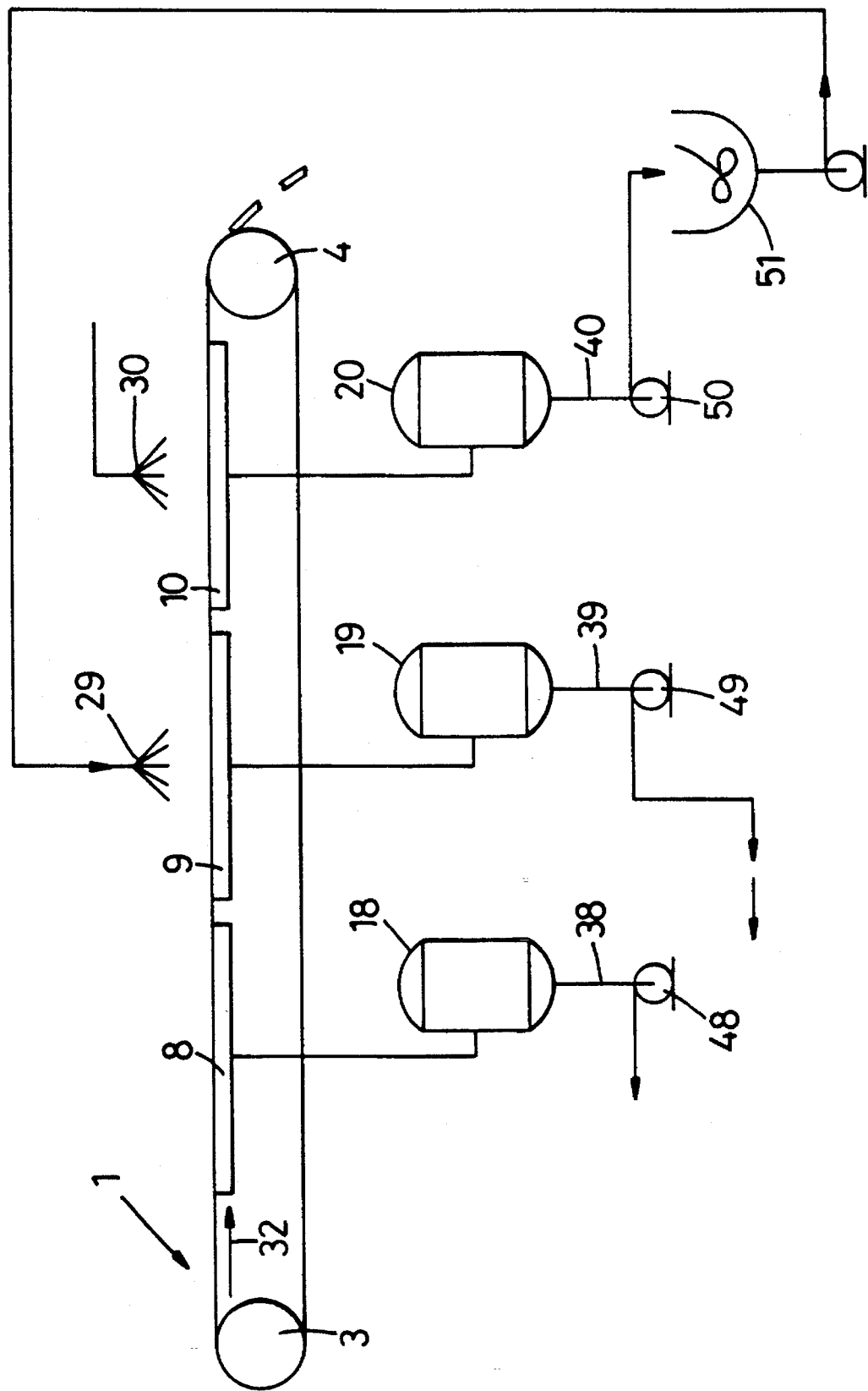

SEPARATION METHOD

TECHNICAL FIELD

The present invention relates to a method for separating solid from a mixture of solid and liquid components.

A typical example of a method for separating components of such a mixture is filtration. This involves use of a filter comprising a porous medium or screen which, when such a mixture is applied to it, retains solid as a damp filter cake, whilst allowing liquid filtrate to pass through the filter. It may be the object of such separation methods to remove solid contaminant from the liquid, for subsequent disposal of the solid. Alternatively, it may be desirable to harvest the solid substantially free of liquid contaminant. The present invention has particular applicability to the latter type of separation method, in which the solid is to be harvested.

Efficiency of separation methods vary according to the properties of the liquid and solid components, and in particular according to the size and shape of particles in the solid component. Such separation methods may also be assisted in a variety of ways. For example, filtration may be conducted under positive or negative pressure to assist passage of liquid through the filter.

BACKGROUND ART

Filter aids are also available, primarily for use with slurries containing very finely divided solids. The aids are solid materials which may be used to pre-coat and protect the filter and to guard the escape of occasional small particles through the filter into the filtrate. It is a requirement that such filter aids be chemically inert to the liquid component and porous to allow passage of liquid therethrough. Examples of commercially available filter aids include diatomaceous silica and expanded perlite.

Once the solid and liquid mixture has been supplied to the filter, and a major proportion of the liquid component has passed therethrough, filtration methods typically include a subsequent washing step for displacing residual liquid component from the filter cake. This usually involves supplying a washing agent to the damp filter cake to displace residual liquid component trapped in interstices between solid particles in the cake. The washing agent is usually a liquid which has a lower boiling point than the liquid component of the mixture so that it may evaporate more readily (i.e. at a lower temperature) from the damp filter cake in a subsequent drying operation.

Prior to any drying operation there is a limit to the amount of liquid component which may be removed from the damp filter cake when relying on mechanical means alone. This limit is reached when closely packed solid particles provide a barrier to prevent further passage of liquid to and through the filter cake. However closely packed the solid particles may be, there will invariably be interstices between them, filled with the liquid component. Once all available sites on the surface of the filter are occupied by solid particles, this prevents further passage of liquid through the filter and thus it is not possible to remove this residual liquid by mechanical means alone. Also, attempts to remove this residual liquid can introduce thermal drying which can concentrate the solid and as such is undesirable.

Problems associated with this entrapment of residual liquid are particularly acute for separation of mixtures containing crystalline inorganic solids, which form relatively open lattice type structures in the filter cake. Adjacent larger crystals or particles may form bridges, blocking movement of smaller particles within the cake and also retaining residual liquid in interstices between them.

OBJECT OF THE INVENTION

The object of the present invention is to provide an improved method of separating solid particles from a liquid.

SUMMARY OF THE INVENTION

We have now found that filtration for removal of solid particles from a mixture of the solid and a first liquid may be assisted by use of a second liquid, different from the first liquid, supplied to a damp filter cake of solid particles to promote closer packing of the particles in the cake and to assist removal of residual first liquid from interstices between the particles.

This second liquid is distinguished from a mere washing agent, which simply displaces and replaces the first liquid component in interstices between particles, in that the second liquid in fact promotes displacement of the solid particles to allow them to be packed more closely. Thus, use of the present second liquid may result in a change in the nature of the interstices between particles.

In a broad aspect the present invention thus provides a method of filtering solid particles from a first liquid to form a filter cake on a filter, wherein a liquid filter cake densification aid, different from said first liquid, is added to the filter cake to cause densification thereof.

Use of the densification aid results in closer packing of particles in the filter cake. This is illustrated by the fact that the densified filter cake can provide increased resistance to air flow passing through the cake. Whilst we do not wish to be bound by theory, we expect that in many instances the densification aid may be effective to lubricate the particles in the cake and thereby assists closer packing of the particles.

In other embodiments the invention provides a method of separating inorganic solid particles from a mixture of solid and a first liquid, which method involves filtering the mixture to provide a damp filter cake of solid particles on a filter, and addition of a second liquid to the filter cake, which has greater lubricating properties than the first liquid, to lubricate the solid particles and thereby assist displacement and closer packing of solid particles in the cake.

In many circumstances it may be desirable to subject the densified filter cake to a subsequent washing operation so that the solid particles may be harvested substantially free of densification aid. With this in mind, embodiments of the invention provide a method of separating solid particles from a mixture of solid and a first liquid, which method involves filtration of the mixture to provide a damp filter cake of solid particles, addition to the damp filter cake of a second liquid which acts as a densification aid to promote closer packing of solid particles in the cake, and washing of the cake to remove the second liquid and to assist removal of residual first liquid from interstices between solid particles.

In this context, the solid and liquid mixture is filtered to remove a major proportion of the first liquid so that the damp filter cake preferably has a similar degree of wetness as is tolerable prior to a conventional washing operation. Under such circumstances typically the filtration step is effective to provide a filter cake which contains no more than about 40% by volume of the first liquid. Preferably the step is effective to remove about 75 to about 80, and most preferably at least about 85% of the first liquid from the filter cake. It is particularly preferred that this step be vacuum assisted.

As regards choice of a second liquid to act as a densification aid, suitable aids are liquids having lubricating properties which appear to promote closer packing of solid particles, by allowing the particles to slide over one another more readily and thus move closer together. In this regard, it is preferred that the densification aid is a viscous liquid lubricant, having a viscosity greater than that of first liquid.

It is quite surprising that addition of a material which can increase viscosity of the residual (first) liquid in the filter cake could assist such a separation or filtration method. Indeed, it has been a general view in the art that increasing the viscosity of a liquid component in such a mixture would be of no benefit and, in fact, undesirable as it should increase the resistance of the liquid to passage through the filter. This would then hinder the filtration and thus make separation of the solid and liquid more difficult.

In fact, previously it has been the practice to dilute suspensions prior to filtration to reduce the viscosity of the liquid component, to assist its passage through the filter and thereby to decrease the filtration time.

Suitably the second liquid, which is used as a densification aid, has a viscosity up to about 20% greater than that of the first liquid, conveniently up to about 15% greater when measured at the temperature at which the second liquid is added to the filter cake. It is most preferred that the second liquid has a viscosity no more than 10% greater than the first liquid. Accordingly, in preferred embodiments the second liquid is added to the damp filter cake in an amount effective to increase the viscosity of the first liquid in the cake by up to about 20%, preferably no more than about 10%, and most preferably by up to about 5%.

The present method is particularly appropriate for filtration of aqueous-based mixtures, where the first liquid is water or an aqueous solution. Thus, in the case where the first liquid is water or an aqueous solution, or any other solution of comparable viscosity, preferably the second liquid has a viscosity of between about 0.8 to about 1.2 cPS, when measured at 20° C., more preferably from about 1.0 to about 1.1 cPS.

It is also preferred that the second liquid be substantially soluble or miscible in the first liquid, so that separation of the first and second liquids into distinct phases either within the cake or in the filtrate is avoided. Preferably the second liquid is at least about 85% miscible or soluble in the first liquid (or vice versa) at the temperature at which the filtration is to be conducted. More preferably, the second liquid is at least about 90%, suitably about 95% soluble in the first liquid at the filtration temperature.

Suitable second liquids or densification aids are flocculating agents. Particularly suitable second liquids, having appropriate viscosity and solubility characteristics, are salts of organic compounds having a high molecular weight. Examples of preferred second liquids are those which contain salts of polysacharides, suitably alkali metal, alkaline earth metal and ammonium salts of organic compounds having average molecular weights of at least about 30,000, preferably at least about 100,000, most preferably from about 200,000. Particularly preferred second liquids for use with mixtures comprising solid and an aqueous based liquid component, are alkali metal alginates, particularly sodium alginate. (Alginate acid has a molecular weight of about 240,000). It is particularly preferred that the second liquid comprises a salt of a polysaccharide for example) in a solution of the first liquid.

Additional preferred second liquids or densification aids include solutions of high molecular weight proteins or mixtures thereof, preferably water-soluble proteins, suitably those having molecular weights of at least about 10,000, to about 100,000. A particularly preferred such aid is a solution of gelatin, which is a mixture of water-soluble proteins of high average molecular weight, derived from collagen.

Alternative embodiments of the invention preferably involve use of a surface active agent as a second liquid. Again, this is particularly preferred in the case where the first liquid is aqueous based, for example. In this regard, surfactants may include a hydrophilic moiety to confer an extent of water solubility to the aid, and a hydrophobic moiety which may have lubricating properties to assist closer packing of solid particles. Examples of suitable surface active agents include soaps, namely water-soluble alkali or alkaline earth metal or ammonium salts, preferably sodium salts, of saturated or unsaturated fatty acids having at least 8 carbon atoms, typically from about 10 to about 24, usually up to about 18 carbon atoms.

Additional examples of appropriate densification aids include liquid detergents, suitably anionic, non-ionic or zwitterionic detergents. Particularly preferred aids are anionic detergents. Preferred examples of such detergents include alkyl sulphates, alkyl ether sulphates, alkaryl sulphonates, alkyl phosphates, alkyl ether phosphates and alkyl ether carboxylates. Particularly preferred is a mixture of sodium salts of secondary alkyl hydrogen sulphates having from 8 to 18 carbon atoms, and available under the trade name Teepol.

The present invention is particularly effective in the filtration of inorganic solids which comprise discrete particles, preferably crystalline particles. Examples of suitable inorganic solids are gypsum, fly ash, silica balls and xenospheres. Also, particularly effective results are obtained when using solids having an average particle size of the order of a few millimeters, typically at least about 1 mm up to about 5 mm, most preferably up to about 3 mm.

It is preferred that the method is not applied to filtration of fibrous or filamentatious solid materials, since they tend to retain a considerable proportion of liquid by absorption and swelling, rather then simply trapping liquid in interstices.

It is also appropriate to apply the present method to filtration of mixtures in which the solid component of the mixture and the second liquid are substantially mutually chemically inert, so that the second liquid simply assists displacement of the so,Lid particles and promotes escape of residual first liquid, rather than undergoing any chemical reaction with the solid.

Clearly the appropriate effective amount of second liquid for use in the present method may vary according to the characteristics of the second liquid and the solid and liquid components of the mixture. The effective amount of second liquid may be particularly dependant upon the viscosity of the second liquid and its solubility in the first liquid.

As mentioned previously, the damp filter cake is typically washed with a third liquid to flush second liquid from the cake and also to further assist removal of any residual first liquid trapped in interstices between solid particles. Provided the solid particles are not compressible, the filter cake does not revert to its structure prior to treatment with the densification aid. The third liquid should preferably be miscible with the second liquid so that it is effective to flush the second liquid away, and separation of the second and third liquids into distinct phases is avoided. Preferably, the third liquid is the same as the first liquid. In particularly preferred embodiments filtrate comprising the first liquid is recycled and used as the third liquid to wash the filter cake.

The densified filter cake is typically subjected to a drying operation, usually after washing with the third liquid. It is at this stage that considerable energy savings can arise from practicing the present invention, since use of a densification aid can, in many embodiments, provide a filter cake having a residual moisture content of about 20 to 30% less than that obtained using previous methods.

BRIEF DESCRIPTION OF THE DRAWINGS

Embodiments of the invention will now be described in more detail, with reference to the accompanying drawing which is a schematic illustration of horizontal belt filtration apparatus, suitable for use in the present method.

DETAILED DESCRIPTION OF EXEMPLARY EMBODIMENTS

The present example relates to the removal of sulphur from a flue gas. Environmental regulations are becoming increasingly stringent and, accordingly, it is desirable to provide an effective means of removing sulphur from such waste gases, and also for converting the sulphur into a useful product for re-use.

The sulphur-containing flue gas is typically washed and treated with a source of calcium to provide a waste liquor which comprises a mixture of solid particles of calcium sulphate (gypsum) and water. Separation of this mixture may be assisted by the present invention, to harvest the useful gypsum product. In this regard, horizontal belt filtration is an example separation technique.

The technique of horizontal belt filtration is well known. This broadly involves use of an endless permeable belt passing around a roller or pulley system. In general, the liquid-solid mixture to be filtered is supplied to the upper-side of the belt at one end and vacuum applied to the underside of the belt. This is to draw filtrate through the belt whilst the filter cake of solids is retained on the upper surface of the belt. The cake is removed from the belt which then receives a subsequent supply of liquid-solid mixture to continue the filtration cycle.

In the attached illustration, the filter belt is indicated generally as 1, advancing over rollers 3 and 4 and above vacuum boxes 8, 9 and 10, connected to vacuum receivers 18, 19 and 20 respectively. The vacuum receivers 18, 19 and 20 have outlets 38, 39 and 40 in their lower regions which are connected to respective pumps 48, 49 and 50 for liquid therefrom to be directed away from the apparatus e.g. for subsequent treatment or disposal, as discussed in more detail below. Nozzles 29 and 30 are arranged above belt 1 for supply of second and third liquids, respectively.

The mixture to be separated, in this case a gypsum slurry, is supplied to the belt 1 at its end near roller 3. The belt is progressed in the direction of arrow 32, firstly over vacuum box 8. Here, vacuum is applied to the filter belt 1 to draw a major proportion of the first liquid, water, through the belt to receiver 18. This leaves a damp filter cake of solid gypsum particles on the belt 1, which comprises about 85% solid and 15% liquid.

The belt 1 is then advanced to present the damp filter cake over vacuum box 9 and under nozzle 29 for supply of second liquid. An example second liquid is an aqueous solution of a surface active agent, Teepol. This solution is very dilute, usually containing up to about 2 to 5% by volume of Teepol (and thus about 0.2 to 0.5% detergent active). More concentrated solutions can be used but it is not always advantageous to do so because excessive foaming can occur, for example. The Teepol and water are added to vat 51 to prepare a solution of the above concentration to provide the second liquid. The second liquid is then supplied to the damp filter caked from nozzle 29, in an amount effective to increase viscosity of the water in the cake by no more than 10%. Vacuum is also applied to the underside of belt 1 via box 9.

The second liquid is drawn into the damp cake by the vacuum to promote closer packing of solid gypsum particles in the cake and to assist displacement of residual first liquid (water) trapped in interstices between solid particles. The residual first liquid is retained in vacuum receiver 19, and may be subsequently recycled.

We have found that the densified gypsum filter cake exhibits an increased resistance to air flow through the cake, because the gypsum particles are packed more closely together. This is illustrated by the following results, obtained when filtering a gypsum slurry at 40° C. under a vacuum at −0.75 Bar, using a polypropylene monofilament filter cloth.

Under these conditions, conventional belt filtration was conducted, firstly in the absence of a densification aid. A damp filter cake was formed, having a moisture content of 11.2% w/w and allowing air to flow through the cake at a rate of 2000–2600 L/Hr/Dm$^2$.

The process was repeated under equivalent conditions using a solution of Teepol as a densification aid as described above. This produced a filter cake having a moisture content of 7.1% w/w which allowed air to flow through the cake merely at a rate of less than 500 L/Hr/Dm$^2$. This increases resistance to air flow illustrates that the densification aid promotes closer packing of solid particles in the cake, thereby producing a denser cake having fewer or smaller interstices (which provide passages to allow air to flow through the cake).

Returning to the attached drawing, in many instances it will be desirable to wash the densification aid from the filter cake, so that the solid may be harvested substantially free of the aid.

In such cases the belt 1 is advanced to vacuum box 10, where a third liquid such as water is supplied via nozzle 30 and vacuum applied to draw the third liquid and residual second liquid through the filter cake into vacuum receiver 20. The mixture of second and third liquids, which is a dilute Teepol solution, may be recycled as appropriate. For example, the mixture of second and third liquids may be recycled and supplied to vat 51 and used for making up a fresh solution of second liquid and passed to nozzle 29 for treatment of a subsequent filter cake.

Clearly, the present invention is applicable to various filtration techniques and is not limited to the horizontal belt method.

Improved results have been obtained using a densification aid for separation of gypsum from an aqueous first liquid, as previously described, and also for harvesting other crystalline inorganic solids such as fly ash, xenospheres and coarse diatamaceous earth. Clearly, the technique can assist filtration of a host of other inorganic solids.

In addition to the Teepol solution described above, favourable results have been obtained using second liquids which comprise dilute aqueous solutions of other detergents, soaps, and flocculating agents such as alginates and gelatins. The optimum amount of each second liquid appropriate to a given set of reaction conditions can soon be determined by experiments, which need not be explained in detail here.

As previously discussed, a particular advantage of the present invention is that it assists effective separation of solid and liquids from mixtures and can result in energy savings for filtration techniques, particularly in the final step for drying the separated solid.

I claim:

1. A method of separating non-compressible solid particles from a mixture of non-compressible solid particles and a first liquid which is water or an aqueous-based solution, which method comprises:

(i) filtering the mixture to provide a damp filter cake of said solid particles on a filter medium;

(ii) adding to said damp filter cake, while an said filter medium, a densification aid in the form of a second liquid, different from the first liquid, miscible therewith, and having greater lubricating properties than the first liquid, to lubricate the particles and thereby cause closer packing of the particles in the damp cake and displacement of said first liquid from said damp filter cake to form a densified filter cake; and (iii) removing the densification aid from the densified filter cake by washing the densified filter cake, while on said filter medium and maintaining said closer packing of said solid particles, with a third liquid miscible with the first and second liquids, to obtain a product substantially free of said densification aid.

2. A method according to claim 1 in which stage (i) comprises filtering the mixture to provide a cake containing no more than about 40% by volume of the first liquid.

3. A method according to claim 2 in which stage (i) comprises filtering the mixture to provide a cake containing no more than about 25% by volume of the first liquid.

4. A method according to claim 1 wherein the second liquid has a viscosity greater than that of the first liquid.

5. A method according to claim 4 wherein the second liquid has a viscosity of up to about 20% greater than that of the first liquid, at the temperature at which the second liquid is added to the filter cake.

6. A method according to claim 5 wherein the second liquid has a viscosity of up to about 10% greater than that of the first liquid.

7. A method according to claim 1 wherein the densification aid is a surface active agent.

8. A method according to claim 7 wherein the densification aid is a solution of sodium salts of secondary alkyl hydrogen sulphates having 8–18 carbon atoms.

9. A method according to claim 1 wherein the densification aid is a salt of a polysaccharide.

10. A method according to claim 9 wherein the densification aid is selected from the group consisting of alkali metal alginates, alkaline earth metal alginates and ammonium alginates.

11. A method according to claim 1 wherein the densification aid is a water-soluble protein having a molecular weight of at least about 10,000.

12. A method according to claim 11 wherein the densification aid comprises an aqueous solution of gelatin.

13. A method according to claim 1 in which the densification aid and the solid are mutually chemically inert.

14. A method according to claim 1 wherein the third liquid is the same as the first liquid.

15. A method according to claim 14 wherein the separated first liquid is recycled and used as the third liquid to wash the cake.

16. A method according to claim 1 wherein the solid is a crystalline material.

17. A method according to claim 1 wherein the solid is an inorganic material.

18. A method according to claim 17 wherein the solid is calcium sulphate.

19. A method according to claim 1 additionally comprising subjecting the densified filter cake to a drying operation.

* * * * *